United States Patent
Tajima et al.

(10) Patent No.: US 9,246,661 B2
(45) Date of Patent: Jan. 26, 2016

(54) CONTROL APPARATUS, BASE STATION, AND TERMINAL

(71) Applicant: FUJITSU LIMITED, Kawasaki-shi, Kanagawa (JP)

(72) Inventors: Yoshiharu Tajima, Yokohama (JP); Naoyuki Saito, Yokosuka (JP); Kazuaki Ando, Shibuya (JP)

(73) Assignee: FUJITSU LIMITED, Kawasaki (JP)

( * ) Notice: Subject to any disclaimer, the term of this patent is extended or adjusted under 35 U.S.C. 154(b) by 102 days.

(21) Appl. No.: 14/101,042

(22) Filed: Dec. 9, 2013

(65) Prior Publication Data

US 2014/0177510 A1    Jun. 26, 2014

(30) Foreign Application Priority Data

Dec. 21, 2012    (JP) ................. 2012-280287

(51) Int. Cl.

| | |
|---|---|
| *H04H 20/71* | (2008.01) |
| *H04W 4/00* | (2009.01) |
| *H04W 68/00* | (2009.01) |
| *H04W 36/00* | (2009.01) |
| *H04L 1/18* | (2006.01) |
| *H04L 5/00* | (2006.01) |
| *H04L 12/18* | (2006.01) |

(52) U.S. Cl.
CPC .......... *H04L 5/0078* (2013.01); *H04L 12/1881* (2013.01); *H04L 12/189* (2013.01)

(58) Field of Classification Search
USPC ............ 370/312, 329; 455/560, 436; 714/749
See application file for complete search history.

(56) References Cited

U.S. PATENT DOCUMENTS

| | | | |
|---|---|---|---|
| 2004/0092289 A1* | 5/2004 | Yamada et al. | 455/560 |
| 2006/0030323 A1* | 2/2006 | Ode et al. | 455/436 |
| 2010/0005355 A1* | 1/2010 | Niu et al. | 714/749 |
| 2010/0165903 A1* | 7/2010 | Inohiza | 370/312 |
| 2012/0057541 A1* | 3/2012 | Choi et al. | 370/329 |

FOREIGN PATENT DOCUMENTS

JP    2010-206316 A    9/2010

* cited by examiner

*Primary Examiner* — Kiet Tang
(74) *Attorney, Agent, or Firm* — Arent Fox LLP

(57) ABSTRACT

A control apparatus in a communication system including a base station and terminals, the control apparatus including: a memory, and a processor coupled the memory and configured to receive data addressed to M terminals (where M is a natural number equal to or greater than 2) of the terminals, and to transmit the received data to the base station, such that N terminals (where N is a natural number less than M) of the M terminals are scheduled in the same timing by the base station.

7 Claims, 20 Drawing Sheets

CONTROL APPARATUS, BASE STATION, AND TERMINAL

CROSS-REFERENCE TO RELATED APPLICATION

This application is based upon and claims the benefit of priority of the prior Japanese Patent Application No. 2012-280287, filed on Dec. 21, 2012, the entire contents of which are incorporated herein by reference.

FIELD

The embodiment discussed herein is related to a control apparatus, a base station, and a terminal.

BACKGROUND

In a mobile communication system, 3rd Generation mobile communication services are conducted. Communication standards applied to a 3rd Generation (3G) mobile communication system include the following, for example. Namely, first there is High Speed Downlink Packet Access (HSDPA) and High Speed Uplink Packet Access (HSUPA), as well as the combination of the two, High Speed Packet Access (HSPA). Also, there is the successor to HSPA, High Speed Packet Access Plus (HSPA+), as well as 3GPP Long Term Evolution (LTE). Note also that a successor to LTE called LTE-Advanced is also under review.

In such 3rd Generation and newer mobile communication systems, in order to improve spectral efficiency, a single channel is used by multiple users, that is, multiple mobile terminals. In other words, a shared channel is used by multiple users.

In order to enable the use of a shared channel by multiple users, a base station uses scheduling to allocate shared channel resources to data addressed to multiple users. With this shared channel scheduling, data is scheduled in order, starting from data received earlier. In other words, scheduling is conducted on existing data. For this reason, data groups addressed to multiple users that are contemporaneously received and kept in a buffer is scheduled with the same schedule timings. In other words, in the case where multiple mobile terminals are included as the addressees of received data groups, scheduling is conducted for all mobile terminals. Also, with this shared channel scheduling, more frequencies are allocated to users with better reception quality. In other words, for data addressed to a user with better reception quality, more data is transmitted per unit time. Note that fairness among terminals is also considered during frequency allocation.

For example, in the case where data is kept in a buffer for multiple mobile terminals, that is, UEs 1, 2, and 3 at a given scheduling timing, all UEs 1, 2, and 3 become subject to scheduling. Additionally, in the case where UE 1 and UE 2 have the same reception quality but the reception quality of UE 3 is lower than the reception quality of UE 1 and UE 2, frequency with the same bandwidth is allocated to UE 1 and UE 2, as illustrated in FIG. 1. Meanwhile, frequency with a narrower bandwidth than the bandwidth for UE 1 and UE 2 is allocated to UE 3. FIG. 1 is a diagram provided to explain a scheduling method of the related art.

For details, see Japanese Laid-open Patent Publication No. 2010-206316.

SUMMARY

According to an aspect of the invention, a control apparatus in a communication system including a base station and terminals, the control apparatus includes: a memory, and a processor coupled the memory and configured to receive data addressed to M terminals (where M is a natural number equal to or greater than 2) of the terminals, and to transmit the received data to the base station, such that N terminals (where N is a natural number less than M) of the M terminals are scheduled in the same timing by the base station.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
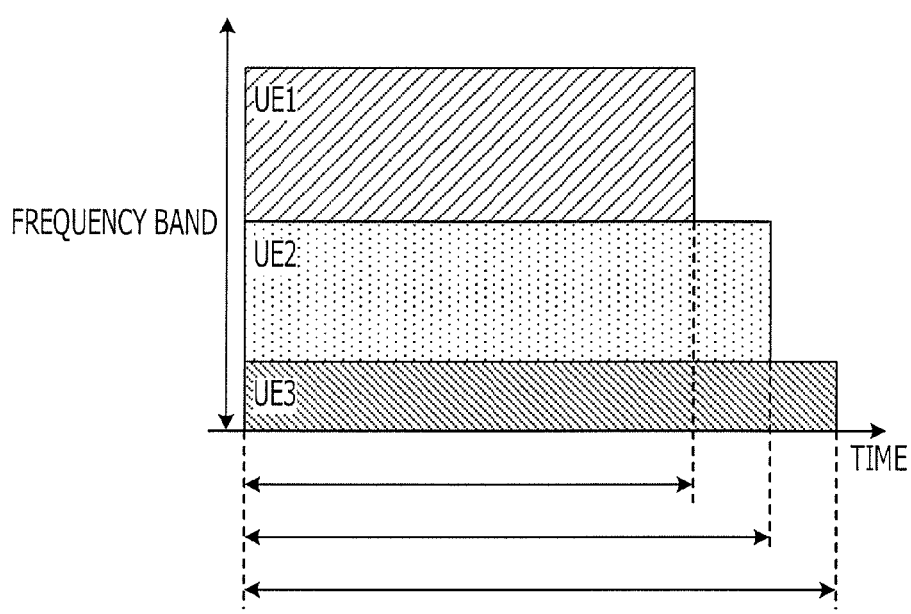
FIG. 1 is a diagram provided to explain a scheduling method of the related art.

However, in the case of scheduling existing data as in FIG. 1, there is an increased possibility of a situation in which the time to complete data transmission to multiple mobile terminals varies complexly according to frequency. This is because the bandwidth of the frequency allocated to each mobile terminal differs, or the amount of data addressed to each mobile terminal differs. If subsequent scheduling is conducted in such a situation, the timings at which allocable wireless resources appear vary complexly according to frequency. For this reason, subsequent scheduling is restricted and the freedom of scheduling is lowered, raising the possibility of an increase in unused wireless resources. As a result, there is a higher possibility that the above will lead to lower utilization of wireless resources.

Being devised in light of the above, it is an object of the disclosed technology to provide a control apparatus, a base station, a communication system, a terminal, a control method, and a transmission method able to improve the utilization of wireless resources. Another object is to reduce terminal power consumption.

Hereinafter, an embodiment of a control apparatus, a base station, a communication system, a terminal, a control method, and a transmission method disclosed in this application will be described in detail on the basis of the drawings. However, a control apparatus, a base station, a communication system, a terminal, a control method, and a transmission method disclosed in this application are not limited by this embodiment. Also, like signs are given to structural elements having the same function in the embodiment, and duplicate description of such elements will be reduced or omitted.

EXAMPLE 1

[Overview of Communication System]

Figure 2:
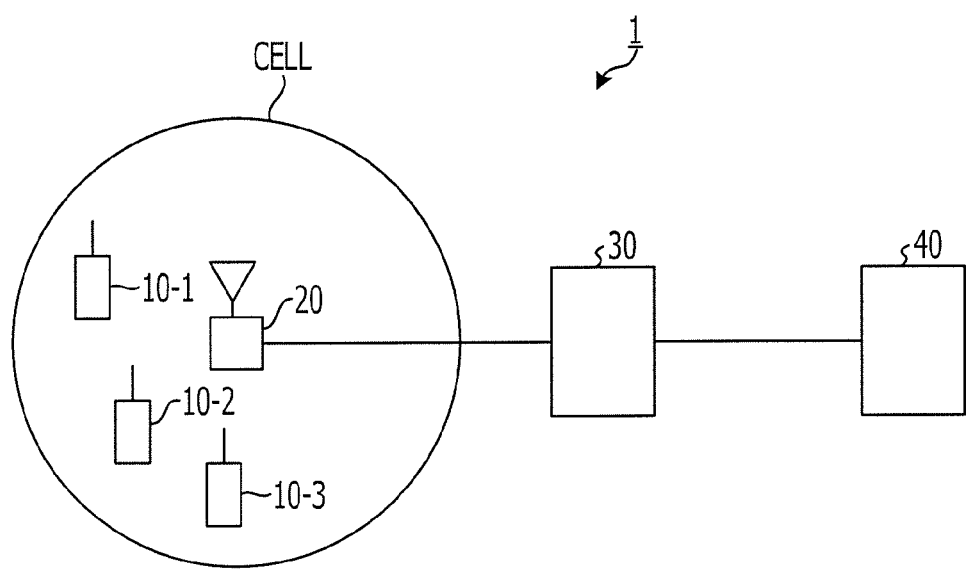
FIG. 2 is a diagram illustrating an example of a communication system according to Example 1.

FIG. 2 is a diagram illustrating an example of a communication system according to Example 1. In FIG. 2, the communication system 1 includes terminals 10-1, 10-2, and 10-3, a base station 20, a control apparatus 30, and a server 40. For the sake of simplicity, the following assumes that there are three terminals 10, one base station 20, one control apparatus 30, and one server 40, but the configuration is not limited thereto. Also, although not illustrated in FIG. 2, a mobile communication system network device or internet network may be provided between the base station 20 and the control apparatus 30, and between the control apparatus 30 and the server 40. Note that hereinafter, the terminals 10-1, 10-2, and 10-3 will simply be called the terminals 10 when not being particularly distinguished. Also, the circle in FIG. 2 represents the area covered by a signal transmitted from the base station 20, or in other words, a cell.

In the communication system 1, each of the terminals 10 transmits an acquisition request for acquiring data from the server 40 to the server 40, via the base station 20 to which the terminal 10 belongs, and the control apparatus 30. The respective data to be acquired by each of the terminals 10 may be a series of data groups, such as content data.

The server 40 transmits data corresponding to an acquisition request to the control apparatus 30.

The control apparatus 30 receives multiple sets of data addressed to the three terminals 10-1, 10-2, and 10-3. The control apparatus 30 then transmits the received data to the base station 20, such that the number of addressee terminals 10 of data transmitted at the same time is a natural number less than 3.

Specifically, the control apparatus 30 determines a schedule for the addressee terminals 10 of data transmitted at the same time, such that the number of addressee terminals 10 of data transmitted at the same time is a natural number less than 3. In detail, the control apparatus 30 determines a rank order (namely priorities) for the three terminals 10-1, 10-2, and 10-3, and determines a schedule on the basis of the determined rank order. The control apparatus 30 then transmits data addressed to the terminals 10-1, 10-2, and 10-3 to the base station 20 on the basis of the determined schedule.

The base station 20 receives multiple sets of data transmitted from the control apparatus 30. The base station 20 then schedules the received data according to a receive order. In other words, the base station 20 determines the resources to allocate to the received data according to the receive order. The base station 20 then uses the allocated resources to transmit data to the addressee terminals 10.

In this case, the control apparatus 30, which is a higher-tier station over the base station 20, receives M sets of data addressed to the terminals 10 (where M is a natural number equal to or greater than 2), and transmits M sets of data addressed to the terminals 10 to the base station 20 such that the number of addressee terminals 10 of data transmitted at the same time is a natural number less than M. In other words, per-terminal scheduling is executed in the control apparatus 30 prior to the execution of scheduling for existing data in the base station 20.

In so doing, the control apparatus 30 is able to reduce the number of terminals 10 that become scheduled with the same timings in the base station 20. Thus, it is possible to simplify scheduling in the base station 20, while also raising the freedom of scheduling for the control apparatus 30 and the base station 20 overall. As a result, it is possible to improve wireless resource utilization in the base station 20.

[Terminal Configuration]

Figure 3:
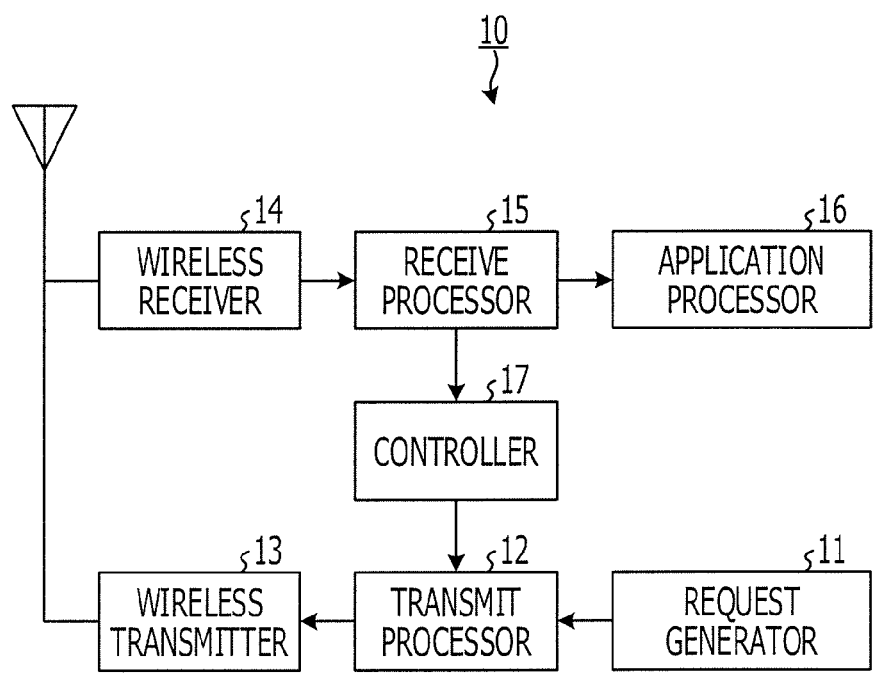
FIG. 3 is a function block diagram illustrating an example of a terminal according to Example 1.

FIG. 3 is a function block diagram illustrating an example of a terminal according to Example 1. In FIG. 3, the terminal 10 includes a request generator 11, a transmit processor 12, a wireless transmitter 13, a wireless receiver 14, a receive processor 15, an application processor 16, and a controller 17.

The request generator 11 generates an acquisition request for acquiring data from the server 40. The acquisition request includes identification information for the data being requested, identification information for the terminal device itself, which is unique to each terminal 10, and identification information for the base station 20 accommodating the terminal device itself. The generated acquisition request is output to the transmit processor 12.

The transmit processor 12 forms a transmit signal by mapping an acquisition request generated by the request generator 11 to a control channel, and outputting the formed transmit signal to the wireless transmitter 13. Also, the transmit processor 12 forms a transmit signal by mapping reception quality-related information received from the controller 17, such as a channel quality indicator (CQI), for example, to a control channel, and outputting the formed transmit signal to the wireless transmitter 13.

The wireless transmitter 13 performs designated wireless transmission processing, such as digital-to-analog conversion and up-conversion, on a transmit signal formed by the transmit processor 12, and transmits the obtained wireless signal to the base station 20 via an antenna.

The wireless receiver 14 receives a signal transmitted from the base station 20 via an antenna. The wireless receiver 14 then performs designated wireless receiving processing, such as down-conversion and analog-to-digital conversion, on the receive signal, and outputs the obtained signal to the receive processor 15.

From a receive signal received from the wireless receiver 14, the receive processor 15 extracts data mapped to a resource allocated to the current device by the base station 20. The extracted data is output to the application processor 16 and the controller 17.

The application processor 16 executes an application using data received from the receive processor 15.

The controller 17 measures the reception quality on each frequency on the basis of established data from among data received from the receive processor 15, such as a pilot, for example, and generates the measured reception quality-related information, such as a CQI, for example. The generated reception quality information is output to the transmit processor 12.

[Base Station Configuration]

Figure 4:
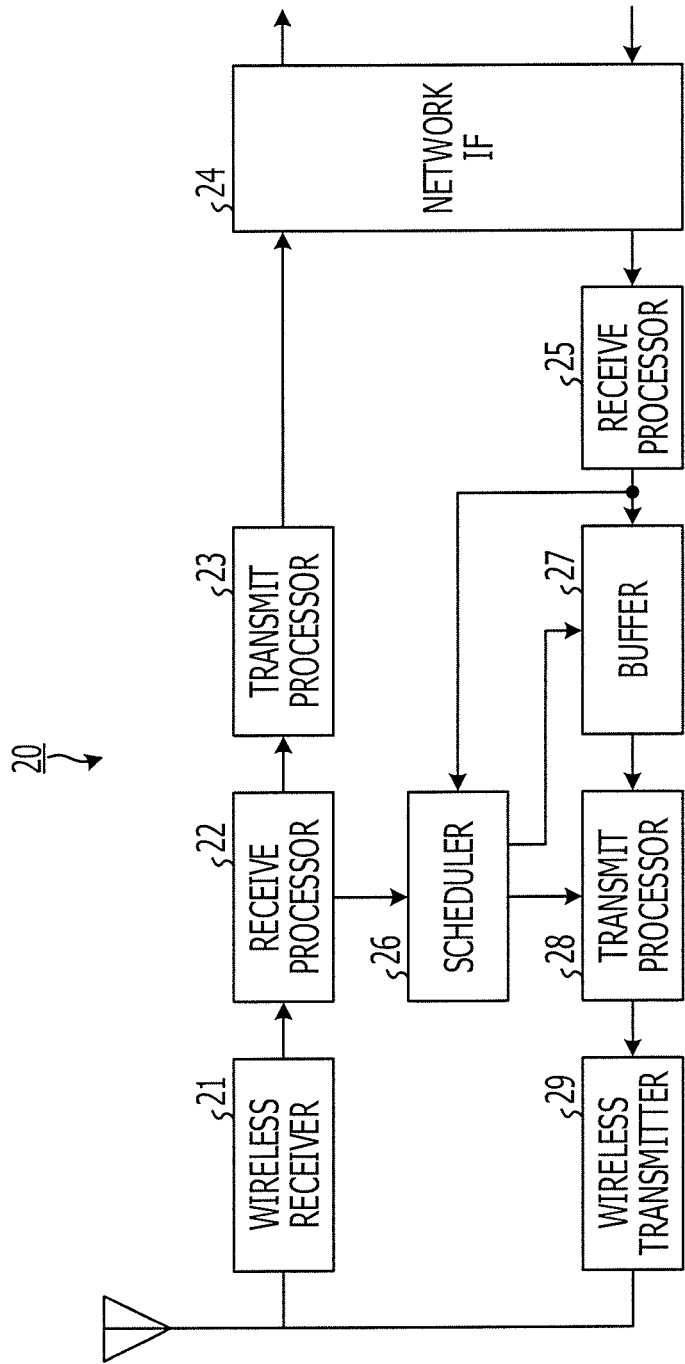
FIG. 4 is a function block diagram illustrating an example of a base station to Example 1.

FIG. 4 is a function block diagram illustrating an example of a base station according to Example 1. The base station 20 in FIG. 4 includes a wireless receiver 21, a receive processor 22, a transmit processor 23, a network interface (IF) 24, a receive processor 25, a scheduler 26, a buffer 27, a transmit processor 28, and a wireless transmitter 29.

The wireless receiver 21 receives a signal transmitted from a terminal 10 via an antenna. The wireless receiver 21 then performs designated wireless receiving processing, such as down-conversion and analog-to-digital conversion, on the receive signal, and outputs the obtained signal to the receive processor 22.

The receive processor 22 extracts reception quality information from a receive signal received from the wireless receiver 14, and outputs the extracted reception quality information to the scheduler 26. Also, the receive processor 22 extracts an acquisition request from a receive signal received from the wireless receiver 14, and outputs the extracted acquisition request to the transmit processor 23.

The transmit processor 23 forms a transmit signal by mapping an acquisition request received from the receive processor 22 to a resource, and transmits the formed transmit signal to the control apparatus 30 via the network IF 24. As above, at this point, identification information for the base station 20 is included in the acquisition request at the terminal 10. For this reason, it is sufficient for the transmit processor 23 to forward the acquisition request to the control apparatus 30, without adding the base station 20's own identification information to the acquisition request. In other words, for an acquisition request, a tunnel in the data link layer is formed between a terminal 10 and the control apparatus 30 via the base station 20.

The receive processor 25 receives a signal transmitted from the control apparatus 30 via the network IF 24. The receive processor 25 then extracts data addressed to a terminal 10 from the receive signal, and outputs the extracted data to the scheduler 26 and the buffer 27.

The scheduler 26 executes frequency scheduling on the basis of reception quality information received from the receive processor 22. This frequency scheduling is executed according to the receive order of received data. In other words, the scheduler 26 determines the resources to allocate to the received data according to the receive order. Herein, the scheduler 26 is able to specify a receive order on the basis of output data from the receive processor 25.

The scheduler 26 then outputs to the buffer 27 an output instruction signal for data to be transmitted, on the basis of the scheduling result. Also, the scheduler 26 outputs identification information for the transmit data, and information related to a resource to which that transmit data is mapped, to the transmit processor 28 on the basis of the scheduling result.

The buffer 27, on the basis of an output instruction signal received from the scheduler 26, outputs data corresponding to that output instruction signal to the transmit processor 28.

The transmit processor 28, on the basis of identification information for transmit data and resource-related information received from the scheduler 26, forms a transmit signal by mapping data received from the buffer 27 to the resource corresponding to that data. The transmit processor 28 then outputs the formed transmit signal to the wireless transmitter 29.

The wireless transmitter 29 performs designated wireless transmission processing, such as digital-to-analog conversion and up-conversion, on a transmit signal formed by the transmit processor 28, and transmits the obtained wireless signal to a terminal 10 via an antenna.

[Control Apparatus Configuration]

Figure 5:
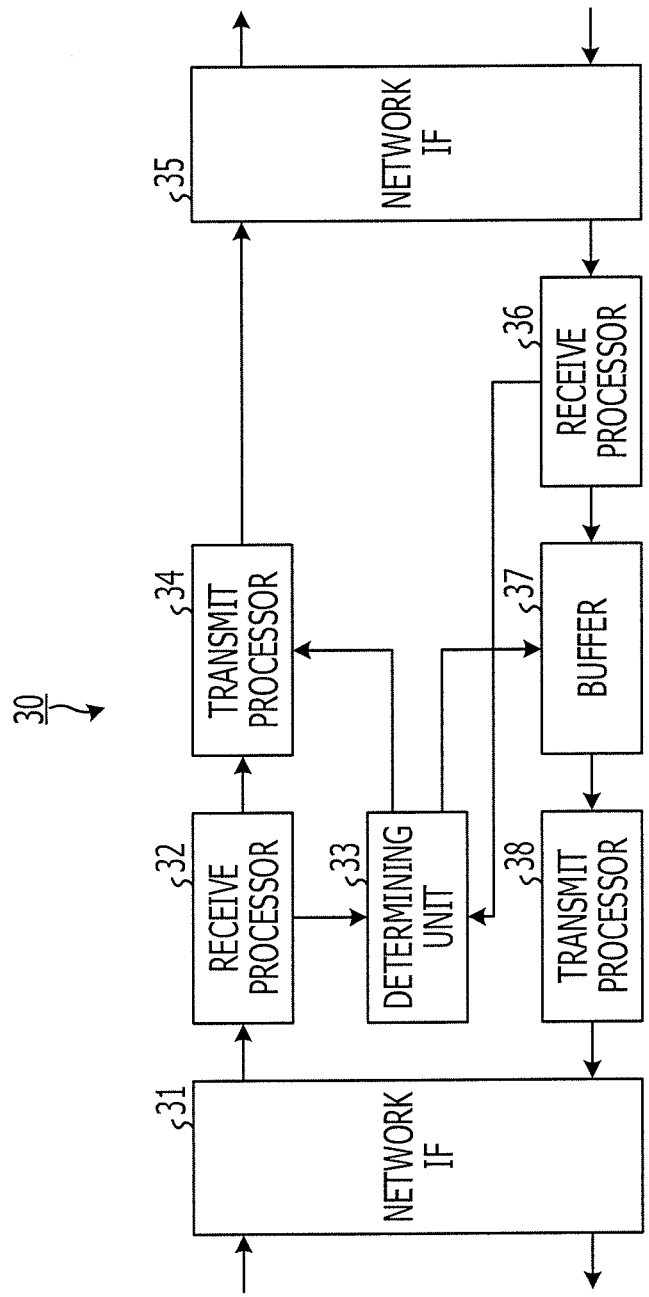
FIG. 5 is a function block diagram illustrating an example of a control apparatus according to Example 1.

FIG. 5 is a function block diagram illustrating an example of a control apparatus according to Example 1. In FIG. 5, the control apparatus 30 includes a network IF 31, a receive processor 32, a determining unit 33, a transmit processor 34, a network IF 35, a receive processor 36, a buffer 37, and a transmit processor 38.

The receive processor 32 receives a signal transmitted from the base station 20 via the network IF 31. The receive processor 32 then extracts an acquisition request from the receive signal, and outputs the extracted acquisition request to the transmit processor 34.

The determining unit 33 receives, from the receive processor 36, information related to receive data corresponding acquisition requests from M (where M is a natural number equal to or greater than 2) terminals 10 (hereinafter, such information may also be called "receive data information"). Subsequently, the determining unit 33 determines a schedule for the addressee terminals 10 of data transmitted at the same time, such that the number of addressee terminals 10 of data transmitted at the same time to the base station 20 from among the data acquired from the server 40 by the M acquisition requests is a natural number less than 3. Specifically, the determining unit 33 determines a rank order for the M terminals 10, and on the basis of the determined rank order, determines a schedule for the addressee terminals 10 of data transmitted at the same time to the base station 20. In other words, per-terminal scheduling is executed. Note that the determining unit 33 is able to ascertain addressee terminals 10 of the receive data on the basis of the receive data information.

The determining unit 33 then outputs the determined schedule to the buffer 37.

The transmit processor 34 forms a transmit signal by mapping an acquisition request received from the receive processor 32 to a resource, and transmits the formed transmit signal to the server 40 via the network IF 35. Note that transmission control of a transmit signal may be controlled by the determining unit 33 receiving an acquisition request from the receive processor 32.

The receive processor 36 receives a signal transmitted from the server 40 via the network IF 35. The receive processor 36 then extracts data addressed to a terminal 10 from the receive signal, and outputs the extracted data to the buffer 37. Also, the receive processor 36 outputs receive data information related to the extracted data to the determining unit 33.

The buffer 37 temporarily holds data addressed to M terminals 10 corresponding to M acquisition requests, which is received from the receive processor 36. Additionally, the buffer 37 outputs data addressed to M terminals 10 to the transmit processor 38, according to the schedule determined by the determining unit 33. Thus, the number of addressee terminals 10 of data output at the same time from the buffer 37 becomes a natural number less than M.

The transmit processor 38 forms a transmit signal by mapping data received from the buffer 37 to a resource, and transmits the formed transmit signal to the base station 20 via the network IF 31. At this point, as above, the number of addressee terminals 10 data output at the same time from the buffer 37 becomes a natural number less than M. For this reason, the transmit processor 38 is able to transmit data addressed to M terminals 10 to the base station 20, such that the number of addressee terminals 10 of data transmitted at the same time is a natural number less than M.

[Server Configuration]

Figure 6:
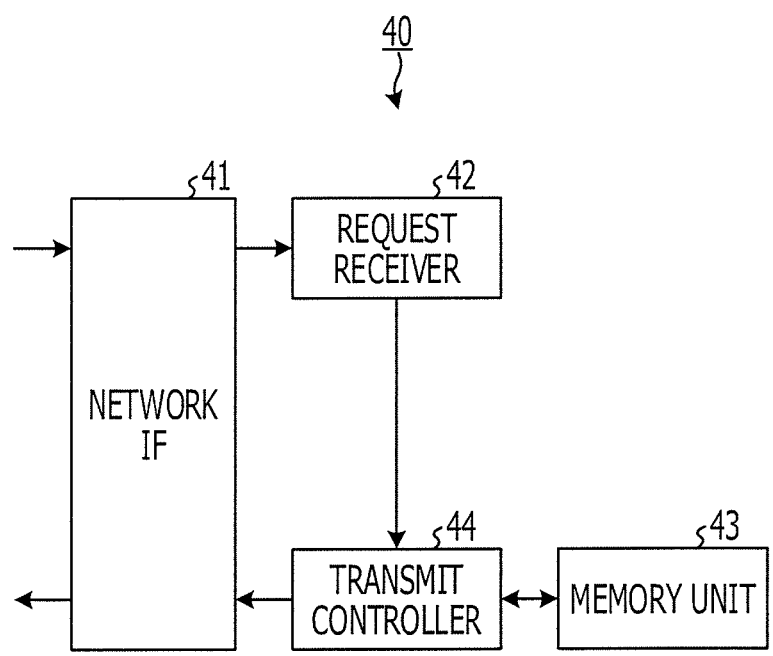
FIG. 6 is a function block diagram illustrating an example of a server according to Example 1.

FIG. 6 is a function block diagram illustrating an example of a server according to Example 1. In FIG. 6, the server 40 includes a network IF 41, a request receiver 42, a memory unit 43, and a transmit controller 44.

The request receiver 42 receives a signal transmitted from the control apparatus 30 via the network IF 41. The request receiver 42 then extracts an acquisition request from the receive signal, and outputs the extracted acquisition request to the transmit controller 44.

The memory unit 43 stores multiple sets of data, such as content data, for example, in association with identification information for each set of data.

The transmit controller 44 retrieves, from the memory unit 43, data corresponding to data identification information included in an acquisition request received from the request receiver 42, and transmits the retrieved data to the control apparatus 30 via the network IF 41.

[Operation of Communication System]

Figure 7:
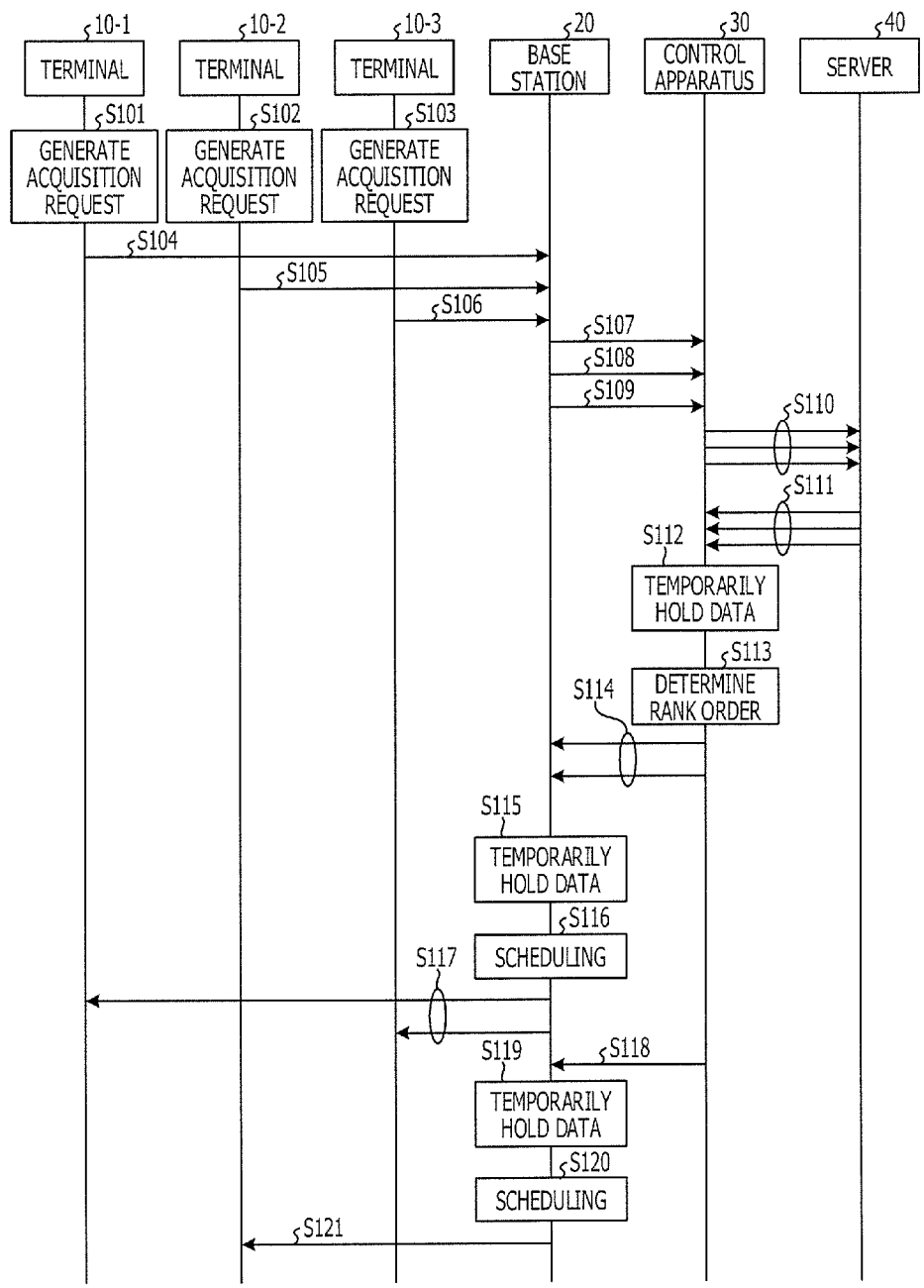
FIG. 7 is a sequence diagram illustrating an example of processing operations in a communication system according to Example 1.

Processing operations in a communication system 1 having the above configuration will now be described. FIG. 7 is a sequence diagram illustrating an example of processing operations in a communication system according to Example 1.

Each of the terminals 10-1, 10-2, and 10-3 generates an acquisition request for acquiring data from the server 40, and transmits the generated acquisition request to the base station 20 (steps S101 to S103 and steps S104 to S106).

At the base station 20, the transmit processor 23 forwards acquisition requests transmitted from the terminals 10-1, 10-2, and 10-3 to the control apparatus 30 (steps S107 to S109).

At the control apparatus 30, the transmit processor 34 forwards multiple acquisition requests forwarded from the base station 20 to the server 40 (step S110). Note that the transmit processor 34 may transmit acquisition requests from the terminals 10-1, 10-2, and 10-3 separately, or first bundle the acquisition requests from the terminals 10-1, 10-2, and 10-3 into a single acquisition request. In the case of bundled transmission, an acquisition request may be formatted as follows. For example, a single bundled acquisition request may include information indicating that the message is an acquisition request, identification information for the terminal 10 which are the sources of the bundled acquisition requests, identification information for the base station 20 accommodating those terminals 10, and identification information for the data being requested.

At the server 40, the transmit controller 44 transmits to the control apparatus 30 data corresponding to the data identification information included in the acquisition requests from the terminals 10-1, 10-2, and 10-3 (step S111).

At the control apparatus 30, the buffer 37 temporarily holds the data transmitted from the server 40 (step S112).

At the server 40, the determining unit 33 determines a rank order for the terminals 10-1, 10-2, and 10-3 which are the addressees of the data acquired from the server 40 (step S113). Herein, assume that the determining unit 33 determines a rank order taking the terminals 10-1 and 10-3 first, and the terminal 10-2 second. By assigning the same rank order to multiple terminals 10 in this way, it is possible to group multiple terminals 10 to be scheduled with the same timings at the base station 20.

At the control apparatus 30, the transmit processor 34 transmits the data corresponding to the terminals 10-1 and 10-3 held in the buffer 37 to the base station 20, following the rank order determined by the determining unit 33 (step S114). Herein, since the terminals 10-1 and 10-3 have the same rank order, transmission of the data corresponding to the terminals 10-1 and 10-3 is started with the same timings.

At the base station 20, the buffer 27 temporarily holds the data transmitted from the control apparatus 30 (step S115).

Subsequently, at the base station 20, the scheduler 26 schedules the data being temporarily held in the buffer 27 and corresponding to the acquisition requests from the terminals 10-1 and 10-3 (step S116).

At the base station 20, the transmit processor 28 transmits the data corresponding to the acquisition requests from the terminals 10-1 and 10-3 to the terminals 10-1 and 10-3, on the basis of the scheduling result (step S117).

Also, at the control apparatus 30, the transmit processor 34 transmits the data corresponding to the acquisition request from the terminal 10-2 and held in the buffer 37 to the base station 20, following the rank order determined by the determining unit 33 (step S118).

At the base station 20, the buffer 27 temporarily holds the data transmitted from the control apparatus 30 and corresponding to the acquisition request from the terminal 10-2 (step S119).

Figure 8:
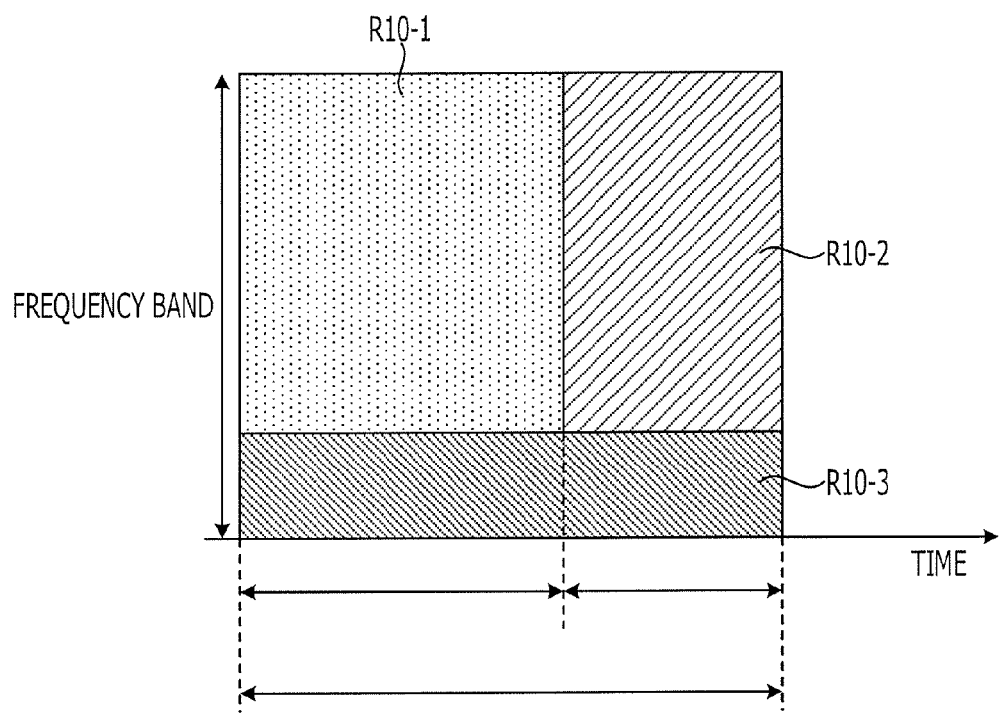
FIG. 8 is a diagram illustrating an example of a scheduling result according to Example 1.

At the base station 20, the scheduler 26 schedules the data being temporarily held in the buffer 27 and corresponding to the acquisition request from the terminal 10-2 (step S120). At this point, FIG. 8 is a diagram illustrating an example of a scheduling result according to Example 1. For example, in FIG. 8, a wireless resource R10-1 is a wireless resource allocated to data addressed to the terminal 10-1, while a wireless resource R10-2 is a wireless resource allocated to data addressed to the terminal 10-2. Also, a wireless resource R10-3 is a wireless resource allocated to data addressed to the terminal 10-3. Meanwhile, scheduling may be made simpler by reducing the number of terminals 10 to be scheduled with the same timings. Subsequently, the control apparatus 30 conducts a process to reduce the number of addressee terminals 10 of data scheduled at the same time in the base station 20. For this reason, as illustrated in FIG. 8, the large free wireless resource area other than the wireless resource R10-1 and the wireless resource R10-3 may be allocated to the terminal 10-2. As a result, there is less variation between the time to complete data transmission to the terminal 10-2 and the time to complete data transmission to the terminal 10-3. For this reason, the freedom of subsequent scheduling becomes higher, and the occurrence of unutilized wireless resources may be reduced. As a result, it is possible to improve wireless resource utilization.

At the base station 20, the transmit processor 28 transmits the data corresponding to the acquisition request from the terminal 10-2 to the terminal 10-2, on the basis of the scheduling result (step S121).

According to the present example as above, at the control apparatus 30, the receive processor 36 receives data addressed to M terminals 10 (where M is a natural number equal to or greater than 2). Subsequently, the transmit processor 38 transmits data addressed to the M terminals 10 to the base station 20, such that the number of addressee terminals 10 of data transmitted at the same time is a natural number less than M.

Specifically, at the control apparatus 30, the determining unit 33 determines a schedule for the addressee terminals 10 of data transmitted at the same time, such that the number of addressee terminals 10 of data transmitted at the same time is a natural number less than M. In detail, the determining unit 33 determines a rank order for the M terminals 10, and determines the above schedule on the basis of the determined rank order. Subsequently, the transmit processor 38 transmits data addressed to M terminals 10 to the base station 20, on the basis of the schedule determined by the determining unit 33.

In so doing, it is possible to reduce the number of terminals 10 that become scheduled with the same timings at the base station 20. Thus, it is possible to simplify scheduling in the base station 20, while also raising the freedom of scheduling for the control apparatus 30 and the base station 20 overall. As a result, the occurrence of unutilized wireless resources may be reduced, making it possible to improve wireless resource utilization in the base station 20. Also, it is possible to reduce power consumption in the base station 20 as a result. Also, since fewer terminals 10 become scheduled with the same timings, it is possible to reduce power consumption by shortening the data receiving times in each terminal 10.

EXAMPLE 2

In Example 2, data type is used as a parameter for determining a rank order. Note that the configurations of the base station and the server in Example 2 are the same as the base station 20 and the server 40 in Example 1.

Figure 9:
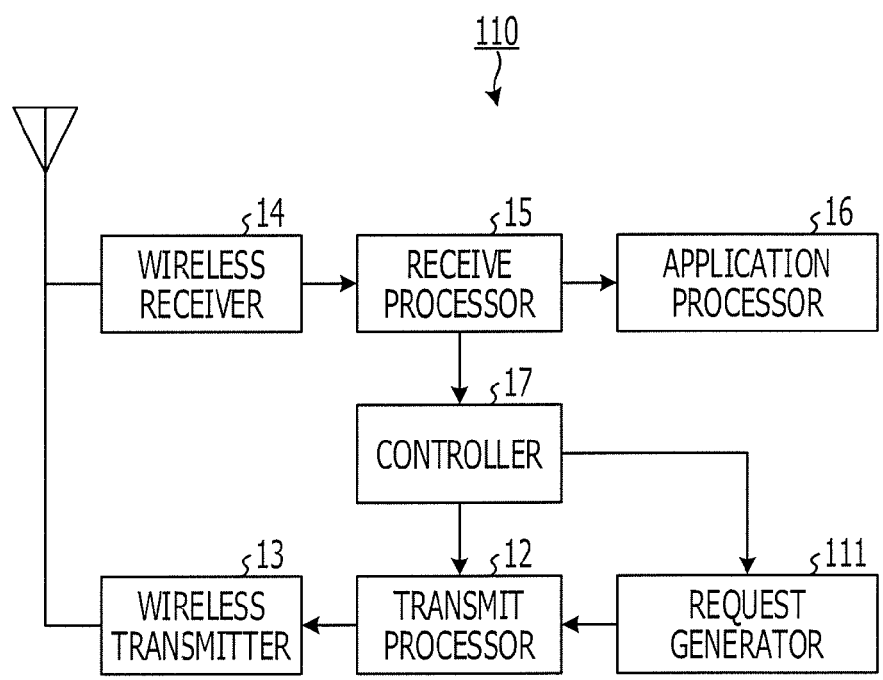
FIG. 9 is a function block diagram illustrating an example of a terminal according to Example 2.

FIG. 9 is a function block diagram illustrating an example of a terminal according to Example 2. In FIG. 9, a terminal 110 includes a request generator 111.

From the controller 17, the request generator 111 receives type information for the data being requested, and generates an acquisition request including the type information. Note that, similarly to Example 1, the acquisition request additionally includes identification information for the data being requested, identification information for the terminal device itself, which is unique to each terminal 10, and identification information for the base station 20 accommodating the terminal device itself. The generated acquisition request is output to the transmit processor 12.

Herein, the data type is prescribed by the service type, such as audio, video, and web browsing, as well as the transmission periodicity or the like, for example.

Figure 10:
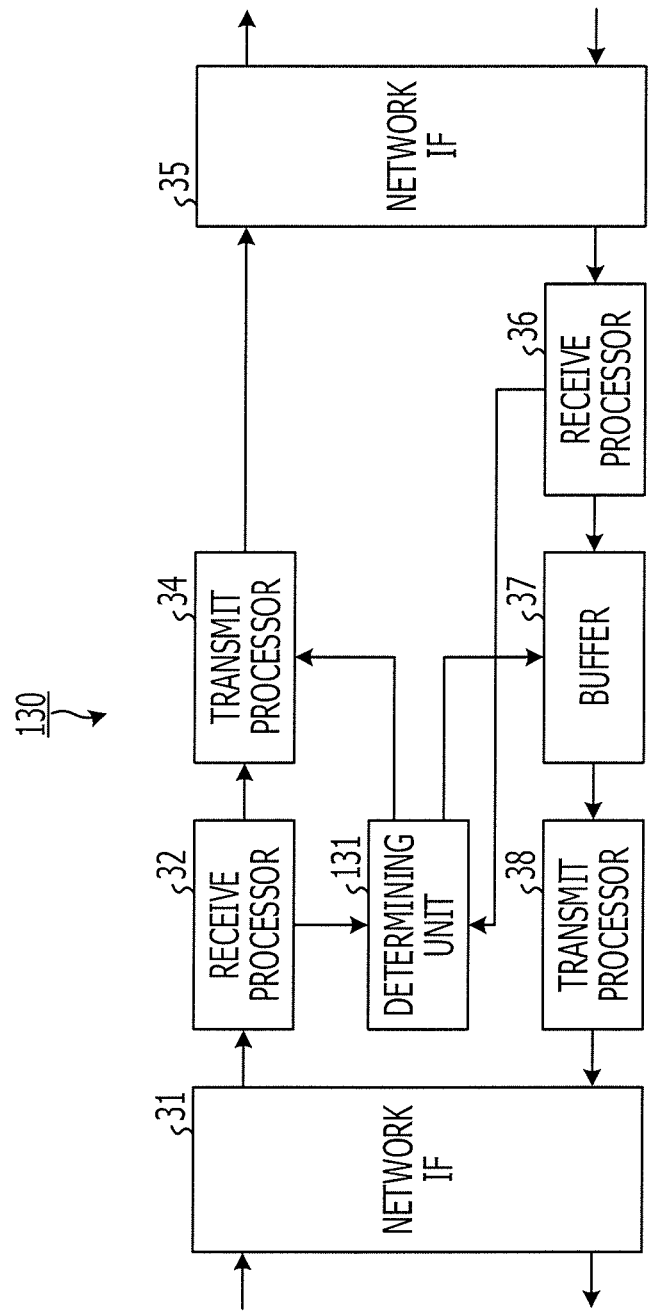
FIG. 10 is a function block diagram illustrating an example of a control apparatus according to Example 2.

FIG. 10 is a function block diagram illustrating an example of a control apparatus according to Example 2. In FIG. 10, the control apparatus 130 includes a determining unit 131.

The determining unit 131 determines a rank order for the M terminals 110 corresponding to the M acquisition requests, on the basis of the data type information included in the receive data information received from the receive processor 36. In other words, the determining unit 131 determines a rank order for the M terminals 110 on the basis of the type information for the data addressed to the M terminals 110. Note that in the case where the acquisition requests from the M terminals 110 include information used to determine a rank order, the determining unit 131 may also receive the acquisition requests from the receive processor 22 and determine a rank order on the basis of the information included in those acquisition requests.

Specifically, the determining unit 131 includes a memory unit (not illustrated). This memory unit holds a table associating multiple data type candidates with an index related to real-time demand according to each data type candidate. For example, the higher the index related to real-time demand, the greater is the demand for real-time performance. The determining unit 131 then determines an earlier rank order to terminals 110 corresponding to receive data information that includes type information for data having a high real-time demand. In other words, in the case where a first data type has a higher real-time demand than a second data type, the determining unit 131 sets the rank order of a first terminal 110 to which the first data is addressed before the rank order of a second terminal 110 to which the second data is addressed.

For example, a terminal 110 demanding the acquisition of data that corresponds to a service having a high real-time demand such as voice has a high priority, and is thus given an earlier rank order. Conversely, a terminal 110 demanding the acquisition of data that corresponds to a service allowing delays such as web browsing has a low priority, and is thus given a later rank order.

According to the present example as above, at the control apparatus 130, the determining unit 131 determines a rank order on the basis of data type information included in receive data information.

In so doing, it is possible conduct per-terminal scheduling according to the type of data to be acquired, and avoid degraded usability for users.

EXAMPLE 3

In Example 3, data size is used as a parameter for determining a rank order. Note that the configurations of the base station and the server in Example 3 are the same as the base station 20 and the server 40 in Example 1. Also, since the basic configuration of the terminal and the control apparatus in Example 3 are the same as the terminal 110 and the control apparatus 130 in Example 2, the description will cite FIGS. 9 and 10.

At the terminal 110 in Example 3, the request generator 111 generates an acquisition request for data to be acquired from the controller 17.

Also, at the control apparatus 130 in Example 3, the determining unit 131 determines a rank order for the M terminals 110 corresponding to the M acquisition requests, on the basis of data size information included in the receive data information received from the receive processor 36. Herein, data size is prescribed as an amount of data to be consecutively transmitted, for example. Note that for a service in which transmission is periodically conducted, data having the data size prescribed at this point is transmitted multiple times.

Specifically, the determining unit 131 determines an earlier rank order for terminals 110 corresponding to receive data information that includes size information indicating a larger size. In other words, in the case where a first data size is larger than a second data size, the determining unit 131 sets the rank order of a first terminal 110 to which the first data is addressed before the rank order of a second terminal 110 to which is the second data is addressed.

According to the present example as above, at the terminal 110, the request generator 111 generates an acquisition request for data to be acquired.

Also, at the control apparatus 130, the determining unit 131 determines a rank order on the basis of data size information included in received data information.

In so doing, it is possible to give an earlier rank order to terminals 110 corresponding to data that takes longer to transmit, and avoid degraded usability for users due to delays.

EXAMPLE 4

In Example 4, wireless quality is used as a parameter for determining a rank order. Note that the configurations of the base station and the server in Example 4 are the same as the base station 20 and the server 40 in Example 1. Also, since the basic configuration of the terminal and the control apparatus in Example 4 are the same as the terminal 110 and the control apparatus 130 in Example 2, the description will cite FIGS. 9 and 10.

At the terminal 110 in Example 4, the controller 17 measures the wireless quality between the terminal itself and the base station 20 that accommodates the terminal itself, and outputs information related to the measured wireless quality to the request generator 111.

Herein, the reception quality of established data, such as a pilot, for example, transmitted from the base station 20 that accommodates the terminal 110, or an error rate of data transmitted from the base station 20 that accommodates the terminal 110 may be used as the wireless quality, for example. For reception quality, a signal-to-interference ratio (SIR) may be used, for example.

The request generator 111 receives wireless quality information from the controller 17, and generates an acquisition request including the wireless quality information.

Also, at the control apparatus 130 in Example 4, the determining unit 131 determines a rank order for the M terminals 110 corresponding to M acquisition requests received from the receive processor 32, on the basis of the wireless quality information included in the acquisition requests.

Specifically, the determining unit 131 determines an earlier rank order for terminals 110 corresponding to acquisition requests that include wireless quality information indicating a lower level. In other words, in the case where the wireless quality between a first terminal 110 and the base station 20 is lower than the wireless quality between a second terminal 110 and the base station 20, the determining unit 131 sets the rank order of the first terminal 110 before the rank order of the second terminal 110.

According to the present example as above, at the terminal 110, the request generator 111 generates an acquisition request including information related to the wireless quality between the terminal itself and the base station 20 accommodating the terminal itself.

Also, at the control apparatus 130, the determining unit 131 determines a rank order on the basis of information included in the acquisition request and related to the wireless quality between a terminal 110 and the base station 20 accommodating that terminal 110.

In so doing, it is possible to give an earlier rank order to terminals 110 corresponding to acquisition requests for data that takes longer to transmit, and avoid degraded usability for users due to delays.

EXAMPLE 5

In Example 5, an arbitrary combination from among data type, data size and wireless quality is used as a parameter for determining a rank order. Note that the configurations of the base station and the server in Example 5 are the same as the base station 20 and the server 40 in Example 1. Also, since the basic configuration of the terminal and the control apparatus in Example 5 are the same as the terminal 110 and the control apparatus 130 in Example 2, the description will cite FIGS. 9 and 10.

At the terminal 110 in Example 5, the request generator 111 generates an acquisition request that includes wireless quality.

Also, at the control apparatus 130 in Example 5, the determining unit 131 determines a rank order for M terminals 110 corresponding to M acquisition requests, on the basis of an arbitrary combination from among data type, data size, and wireless quality. Note that the information related to wireless quality is included in the acquisition requests that the determining unit 131 receives from the receive processor 32. Meanwhile, information related to data size and information related to data type is included in the receive data information that the determining unit 131 receives from the receive processor 36.

Figure 11:
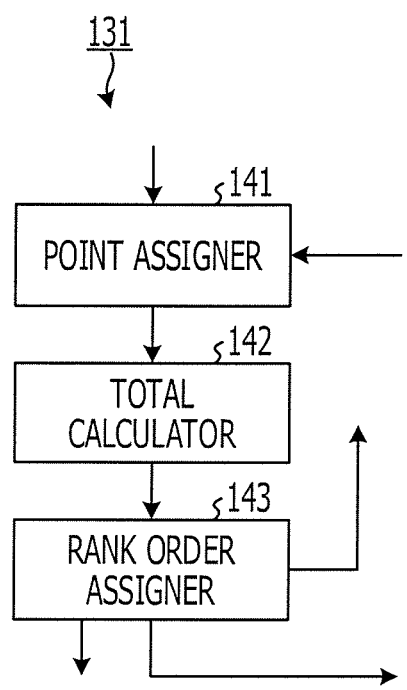
FIG. 11 is a function block diagram illustrating an example of a determining unit according to Example 5.

FIG. 11 is a function block diagram illustrating an example of a determining unit according to Example 5. In FIG. 11, the determining unit 131 includes a point assigner 141, a total calculator 142, and a rank order assigner 143.

The point assigner 141 assigns points to each terminal 110 for each parameter in the above arbitrary combination.

Specifically, the point assigner 141 includes a memory unit (not illustrated). This memory unit stores a first table associating multiple data type candidates with points according to each data type candidate. Also, this memory unit stores a second table associating multiple data size candidates with points according to each data size candidate. Also, this memory unit stores a third table associating multiple wireless quality candidates with points according to each wireless quality candidate. For example, in the first table, higher points are associated with data type candidates that correspond to services having a high real-time demand. Also, in the second table, higher points are associated with data size candidates indicating a large size. Also, in the third table, higher points are associated with wireless quality candidates indicating low wireless quality.

Subsequently, the point assigner 141 assigns points to a terminal 110 on the basis of each parameter in the above arbitrary combination, and the first through third tables.

The total calculator 142 calculates, for each terminal 110, the total value of the points for all parameters constituting the arbitrary combination. For example, in the case where a combination of the above three parameters is used, in which 10 is the highest number of points and 1 is the lowest number of points, the total value has a maximum value of 30 points, and a minimum value of 3 points.

The rank order assigner 143 determines a rank order for each terminal 110 on the basis of a total value calculated by the total calculator 142. For example, the rank order assigner 143 gives an earlier rank order to terminals 110 with greater total values.

According to the present example as above, at the control apparatus 130, the rank order assigner 143 determines a rank order for each terminal 110 on the basis of a total value of points for all parameters constituting an arbitrary combination for each terminal 110.

In so doing, it is possible to determine a rank order for terminals 110 according to multiple parameters.

EXAMPLE 6

In Example 6, the control apparatus calculates a projected time to start transmitting data or a projected time for data to reach an addressee terminal, and transmits information related to the calculated projected times to the relevant terminal. The terminal then displays the received information related to the projected time on a display. Note that the configurations of the base station and the server in Example 6 are the same as the base station 20 and the server 40 in Example 1.

Figure 12:
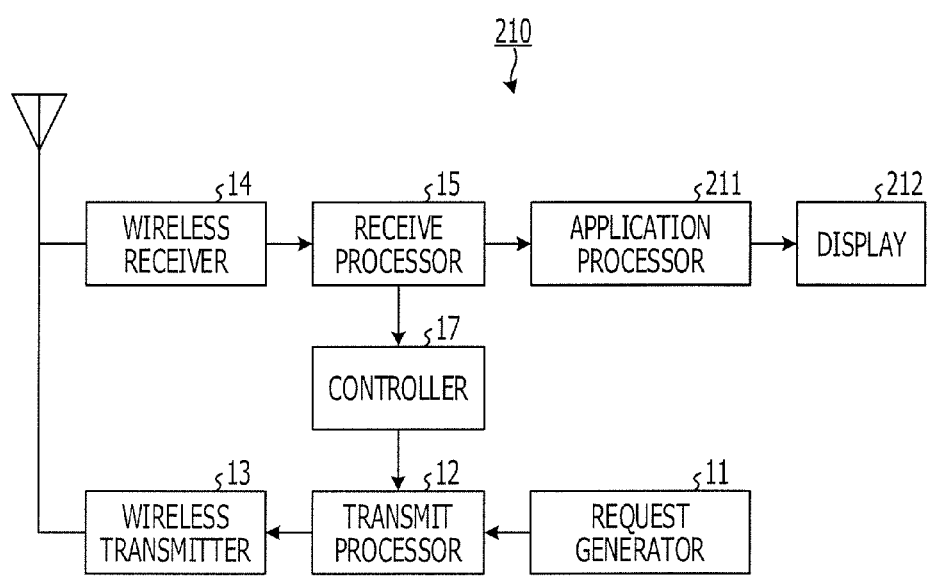
FIG. 12 is a function block diagram illustrating an example of a terminal according to Example 6.

FIG. 12 is a function block diagram illustrating an example of a terminal according to Example 6. In FIG. 12, the terminal 210 includes an application processor 211 and a display 212.

The application processor 211 extracts information related to a projected time included in data received from the receive processor 15, and displays the extracted information on the display 212.

Figure 13:
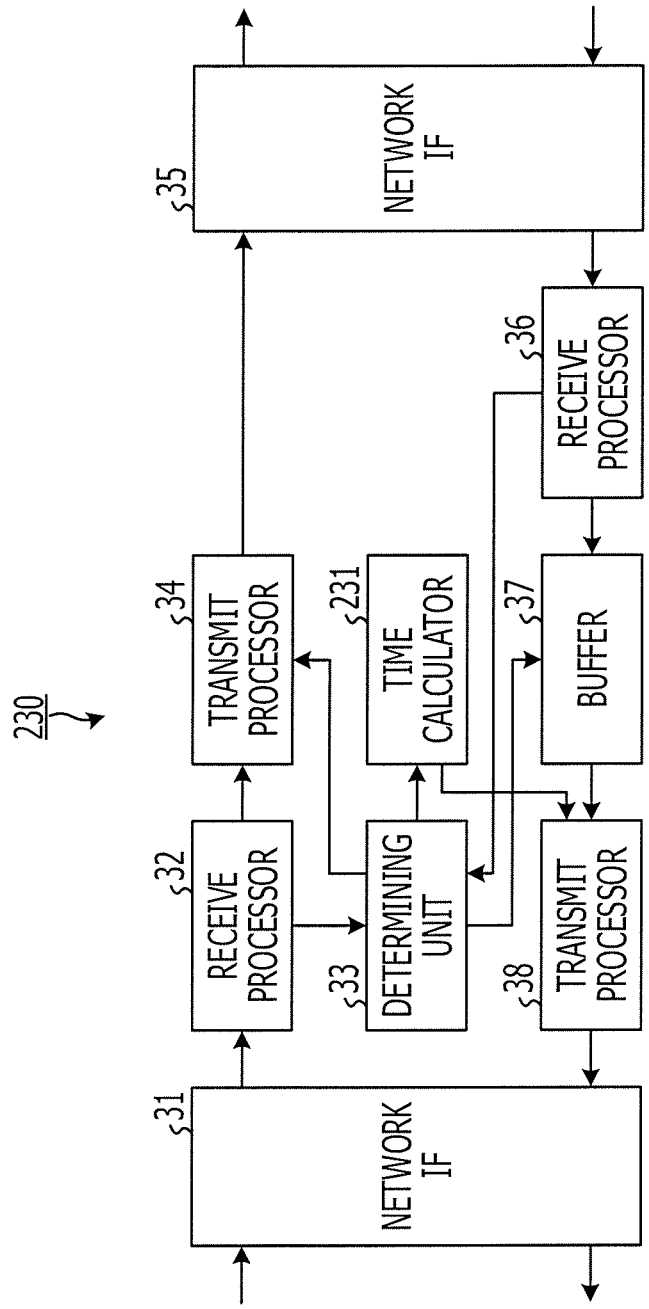
FIG. 13 is a function block diagram illustrating an example of a control apparatus according to Example 6.

FIG. 13 is a function block diagram illustrating an example of a control apparatus according to Example 6. In FIG. 13, the control apparatus 230 includes a time calculator 231.

The time calculator 231 calculates a projected time to start transmitting data addressed to each terminal 210, on the basis of a rank order determined by the determining unit 33. The time calculator 231 then outputs information related to the calculated projected time to the transmit processor 38.

The transmit processor 38 forms a transmit signal by mapping information related to a projected time received from the time calculator 231 to a resource, and transmits the formed transmit signal to the base station 20 via the network IF 31. Information related to a projected time is mapped to a control channel resource, for example.

Note that although the time calculator 231 herein calculates a time at which to start transmitting data addressed to each terminal 210 as a projected time, the configuration is not limited thereto. For example, as above, the time calculator 231 may also calculate a time at which data will reach an addressee terminal 210 as a projected time. The time for data to reach an addressee terminal 210 is calculable by adding the average time taken for a signal transmitted from the control apparatus 230 to reach a terminal 210 to the time at which to start transmitting data, for example.

According to the present example as above, at the control apparatus 230, the time calculator 231 calculates a projected time to start transmitting data addressed to each terminal 210, or a projected time for respective data to reach each terminal 210, on the basis of a rank order determined by the determining unit 33.

Also, at the terminal 210, the receive processor 15 receives information related to a projected time transmitted from the control apparatus 230. The display 212 then displays the received information related to a projected time.

In so doing, it is possible to display an estimate of the time for data to reach the terminal 210, or in other words, information that serves as an estimate of network congestion. Thus, it is possible to provide a user of a terminal 210 with information for making a decision on whether or not to postpone, or whether or not to cancel, a data acquisition request. In other words, it is possible to improve usability for a user of a terminal 210.

Note that in the above description, although the basic configuration of the control apparatus 230 is shared in common with the control apparatus 30 of Example 1, the configuration is not limited thereto. In other words, the basic configuration of the control apparatus 230 may also be shared in common with any of Examples 2 to 5.

EXAMPLE 7

Example 7 presumes that multiple base stations exist under the supervision of a control apparatus. Additionally, the control apparatus determines a rank order of terminals for each group of terminal accommodated by a common base station. Note that the configurations of the terminal, base station, and server in Example 7 are the same as any of Examples 1 to 6.

Figure 14:
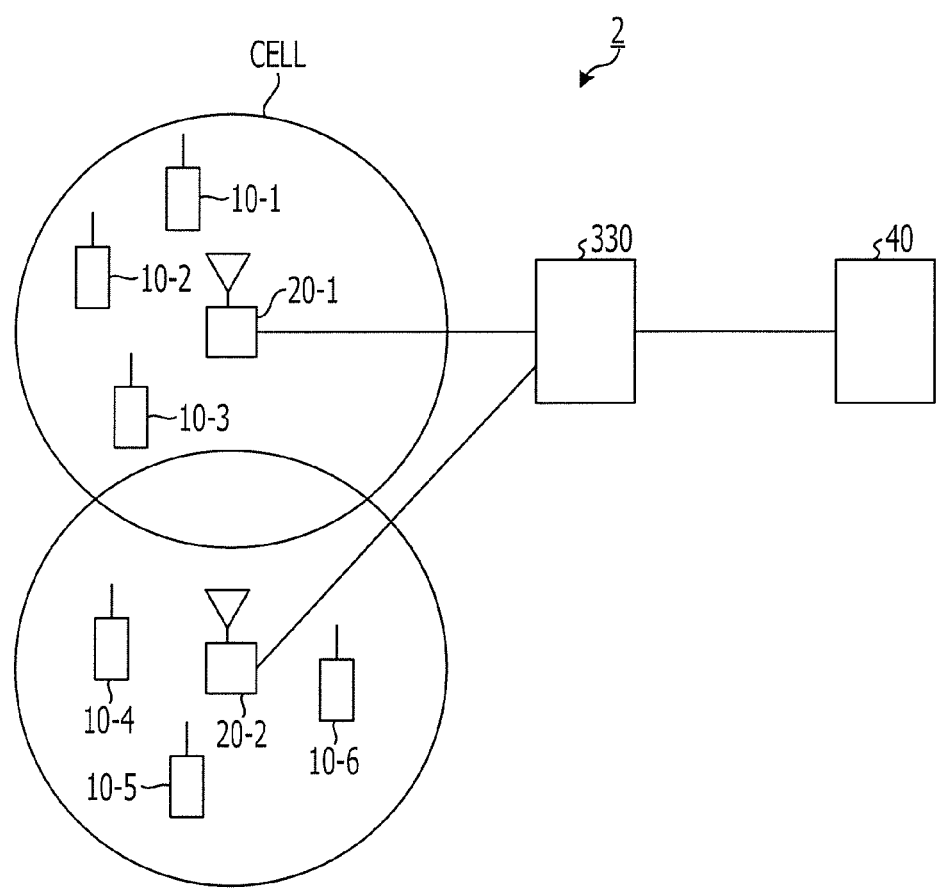
FIG. 14 is a diagram illustrating an example of a communication system according to Example 7.

FIG. 14 is a diagram illustrating an example of a communication system according to Example 7. In the communication system 2 illustrated in FIG. 14, base stations 20-1 and 20-2 are provided under the supervision of a control apparatus 330. Also, terminals 10-1, 10-2, and 10-3 are accommodated by the base station 20-1, while terminals 10-4, 10-5, and 10-6 are accommodated by the base station 20-2. For the sake of simplicity, the following assumes that there are six terminals 20, two base stations 20, one control apparatus 330, and one server 40, but the configuration is not limited thereto. Note that the circles in FIG. 14 represent cells.

Figure 15:
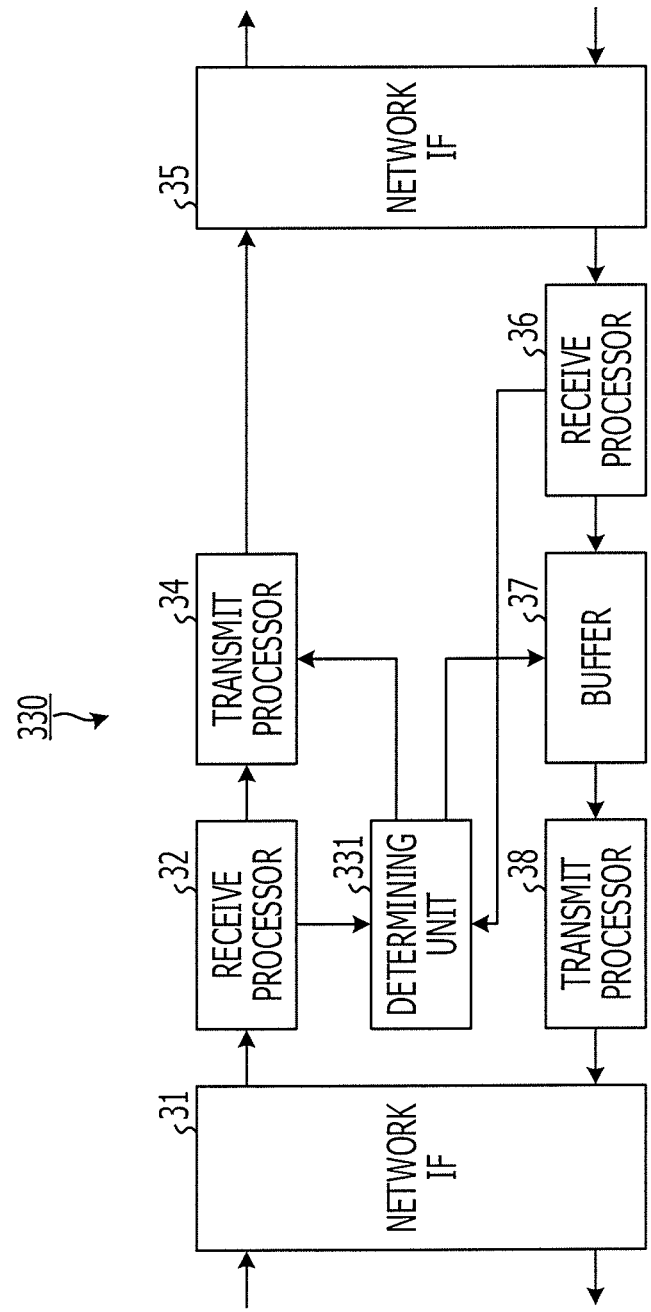
FIG. 15 is a function block diagram illustrating an example of a control apparatus according to Example 7.

FIG. 15 is a function block diagram illustrating an example of a control apparatus according to Example 7. In FIG. 15, the control apparatus 330 includes a determining unit 331.

The determining unit 331 determines, for each group made up of terminals 10 accommodated by a common base station 20, a schedule for the addressee terminals 10 of data transmitted at the same time. Specifically, the determining unit 331 determines a rank order of terminals 10 for each group made up of terminals 10 accommodated by a common base station 20. In other words, in the communication system 2 illustrated in FIG. 14, the terminals 10-1, 10-2, and 10-3 accommodated by the base station 20-1 are put into a first group. Meanwhile, the terminals 10-4, 10-5, and 10-6 accommodated by the base station 20-2 are put into a second group. The determining unit 331 then determines a rank order within the first group, and also determines a rank order within the second group. Subsequently, data addressed to the terminals 10-1, 10-2, and 10-3 is transmitted to the base station 20-1 on the basis of the rank order within the first group, and data addressed to the terminals 10-4, 10-5, and 10-6 is transmitted to the base station 20-2 on the basis of the rank order within the second group.

According to the present example as above, at the control apparatus 330, the determining unit 331 determines, for each group made up of terminals 10 accommodated by a common base station 20, a schedule for the addressee terminals 10 of data transmitted at the same time. Specifically, the determining unit 331 determines a rank order of terminals 10 for each group made up of terminals 10 accommodated by a common base station 20.

In so doing, it is possible for a single control apparatus 330 to control the rank order of terminals 10 accommodated by multiple base stations 20, thereby simplifying the system configuration.

Note that in the above description, although the basic configuration of the control apparatus 330 is shared in common with the control apparatus 30 of Example 1, the configuration is not limited thereto. In other words, the basic configuration of the control apparatus 330 may also be shared in common with any of Examples 2 to 6.

EXAMPLE 8

Examples 1 to 7 presume that the base station and the control apparatus are separate devices. In contrast, Example 8 relates to a base station having a configuration with a built-in control apparatus from any of Examples 1 to 6. Note that the configurations of the terminal and server in Example 8 are the same as any of Examples 1 to 6.

Figure 16:
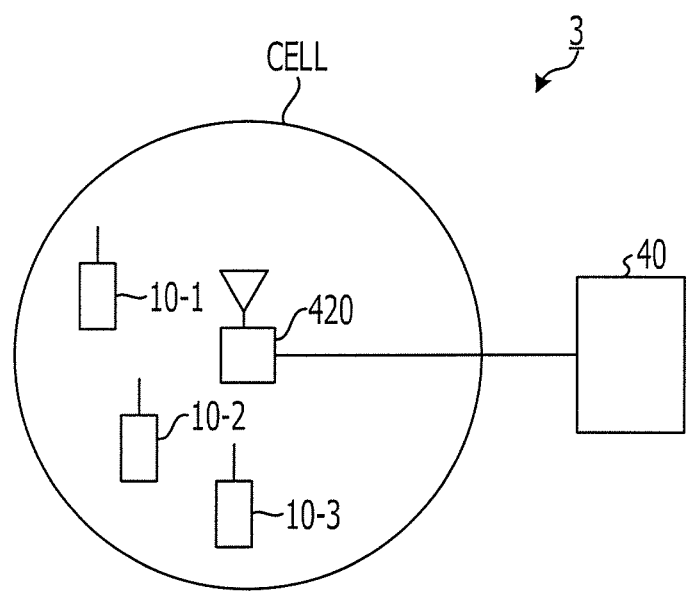
FIG. 16 is a diagram illustrating an example of a communication system according to Example 8.

FIG. 16 is a diagram illustrating an example of a communication system according to Example 8. In FIG. 16, the communication system 3 includes terminals 10-1, 10-2, and 10-3, a base station 420, and a server 40. For the sake of simplicity, the following assumes that there are three terminals 10, one base station 420, and one server 40, but the configuration is not limited thereto. Note that the circle in FIG. 16 represents a cell.

Figure 17:
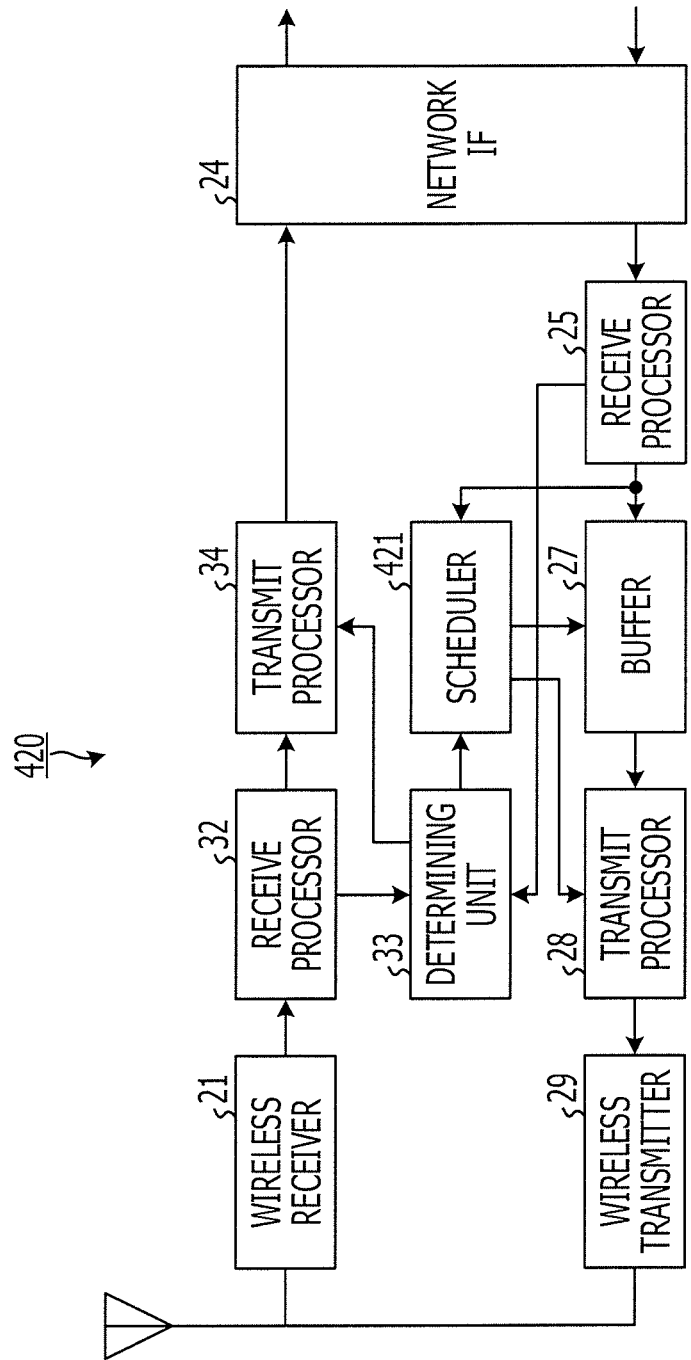
FIG. 17 is a function block diagram illustrating an example of a base station according to Example 8.

FIG. 17 is a function block diagram illustrating an example of a base station according to Example 8. In FIG. 17, the base station 420 includes receive processors 25 and 32, a determining unit 33, a transmit processor 34, and a scheduler 421.

The receive processor 32 receives a signal transmitted from a terminal 10 via an antenna and the wireless receiver 21. The receive processor 32 then extracts an acquisition request from the receive signal, and outputs the extracted acquisition request to the transmit processor 34.

The receive processor 25 includes the functions described in Example 1. Also, the receive processor 25 outputs receive data information related to extracted data to the determining unit 33.

The determining unit 33 determines a schedule for the addressee terminals 10 of data to be scheduled at the same time by the scheduler 421. This schedule is determined such that, from among the data acquired from the server 40 by M acquisition requests, the number of addressee terminals 10 of data to be scheduled at the same time by the scheduler 421 becomes a natural number less than M. Specifically, the determining unit 33 determines a rank order for the M terminals 10, and on the basis of the determined rank order, determines a schedule for the addressee terminals 10 of data to be scheduled at the same time by the scheduler 421.

The determining unit 33 then outputs the determined schedule to the scheduler 421.

The transmit processor 34 forms a transmit signal by mapping an acquisition request received from the receive processor 32 to a resource, and transmits the formed transmit signal to the server 40 via the network IF 24.

The scheduler 421 executes frequency scheduling on the basis of reception quality information received from the receive processor 32. This frequency scheduling is executed according to the schedule determined by the determining unit 33. Thus, it is possible to make the number of addressee terminals of data scheduled at the same time by the scheduler 421 a natural number less than M.

According to the present example as above, at the base station 420, the receive processor 25 receives data addressed to M terminals 10 (where M is a natural number equal to or greater than 2). The determining unit 33 determines a schedule for the addressee terminals 10 of data to be scheduled at the same time by the scheduler 421. This schedule is determined such that the number of addressee terminals 10 of data to be scheduled at the same time by the scheduler 421 becomes a natural number less than M.

In so doing, it is possible to reduce the number of terminals 10 that become scheduled with the same timings in the scheduler 421. Thus, it is possible to simplify scheduling in the scheduler 421, while also raising the freedom of scheduling for the determining unit 33 and the scheduler 421 overall. As a result, the occurrence of unutilized wireless resources may be reduced, making it possible to improve wireless resource utilization in the scheduler 421.

OTHER EXAMPLES

The terminal, base station, and control apparatus of Examples 1 to 8 may be realized by a hardware configuration like the following.

Figure 18:
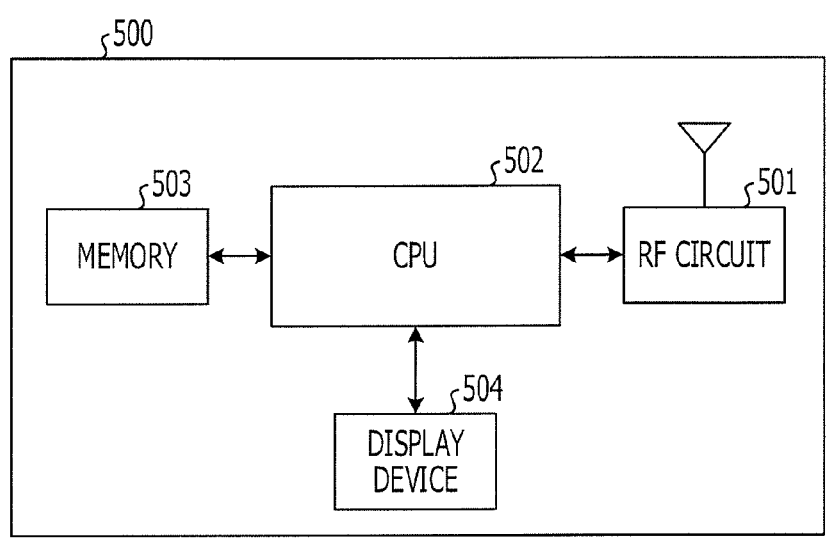
FIG. 18 is a diagram illustrating a hardware configuration of a terminal.

FIG. 18 illustrates an exemplary hardware configuration of a terminal. Hardware-wise, the terminal 500 in FIG. 18 includes an RF circuit 501 including an antenna, a central processing unit (CPU) 502, memory 503, and a display device 504 such as a liquid crystal display (LCD). The CPU 502 is connected to each of the RF circuit 501, the memory 503, and the display device 504 via a bus. The memory 503 is made up of RAM such as synchronous dynamic random access memory (SDRAM), read-only memory (ROM), and flash memory, for example. Also, in the case where the terminal 500 is a mobile phone device, the terminal 500 may also be equipped with components such as a voice input/output unit connected to a microphone and a speaker, as well as an input unit such as operating keys.

Additionally, the wireless transmitter 13 and the wireless receiver 14 are realized by the RF circuit 501. The buffer 27 is realized by the memory 503. The display 212 is realized by the display device 504.

In addition, the various processing functions conducted in the terminals of Examples 1 to 8 may be realized by a computer executing a program prepared in advance. In other words, programs corresponding to the respective processes executed by the request generator 11, the transmit processor 12, the receive processor 15, the application processors 16 and 211, and the controller 17 may also be recorded in the memory 503, and each program may be read out by the CPU 502 to function as a process. Also, the request generator 11, the transmit processor 12, the receive processor 15, the application processor 16, and the controller 17 may also be separated and implemented in multiple CPUs, such as a baseband CPU and an application CPU. In this case, the application processor 16 is realized by the application CPU.

Figure 19:
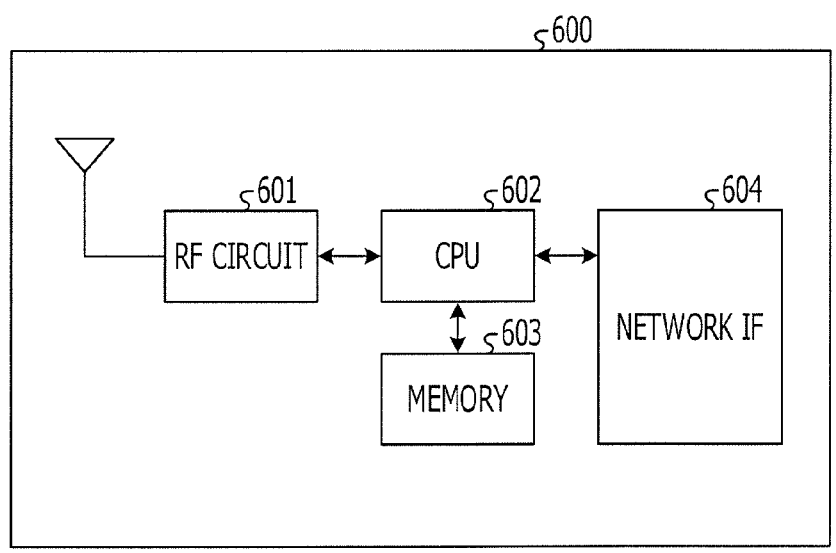
FIG. 19 is a diagram illustrating a hardware configuration of a base station.

FIG. 19 illustrates a hardware configuration of a base station. In FIG. 19, the base station 600 includes an RF circuit 601 including an antenna, a CPU 602, memory 603, and a network interface (IF) 604. The CPU 602 is connected to each of the RF circuit 601, the memory 603, and the network IF 604 via a bus. The memory 603 is made up of RAM such as SDRAM, ROM, and flash memory, for example.

Additionally, the wireless receiver 21 and the wireless transmitter 29 are realized by the RF circuit 601. Also, the buffer 27 is realized by the memory 603. The network IF 24 is realized by the network IF 604.

In addition, the various processing functions conducted in the base stations of Examples 1 to 8 may be realized by a computer executing a program prepared in advance. In other words, programs corresponding to the respective processes executed by the receive processors 22, 25, and 32, the transmit processors 23, 28, and 34, the schedulers 26 and 421, and the determining unit 33 may also be recorded in the memory 603, and each program may be read out by the CPU 602 to function as a process.

Figure 20:
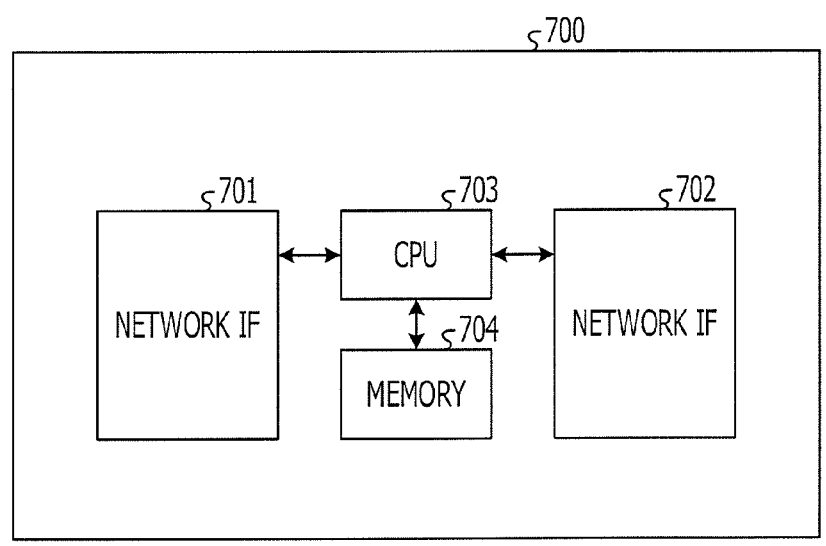
FIG. 20 is a diagram illustrating a hardware configuration of a control apparatus.

FIG. 20 illustrates a hardware configuration of a control apparatus. In FIG. 20, the control apparatus 700 includes network IFs 701 and 702, a CPU 703, and memory 704. The CPU 703 is connected to each of the network IFs 701 and 702 as well as the memory 704 via a bus. The memory 704 is made up of RAM such as SDRAM, ROM, and flash memory, for example.

Additionally, the buffer 37 is realized by the memory 704. The network IFs 31 and 35 are realized by the network IFs 701 and 702.

In addition, the various processing functions conducted in the control apparatus of Examples 1 to 7 may be realized by a computer executing a program prepared in advance. In other words, programs corresponding to the respective processes executed by the receive processors 32 and 36, the determining units 33, 131, and 331, the transmit processors 34 and 38, and the time calculator 231 may also be recorded in the memory 704, and each program may be read out by the CPU 703 to function as a process.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alterations could be made hereto without departing from the spirit and scope of the invention.

What is claimed is:

1. A control apparatus in a communication system including a base station and terminals, the control apparatus comprising:

a memory; and a processor coupled the memory and configured to:

receive data addressed to M terminals (where M is a natural number equal to or greater than 2) of the terminals;

transmit the received data to the base station, such that N terminals (where N is a natural number less than M) of the M terminals are scheduled in the same timing by the base station;

determine priorities for the M terminals, and determine the N terminals based on the determined priorities; and determine the priorities based on at least one of respective data types of the received data, respective data sizes of the received data, and respective wireless qualities between respective M terminals and the base station.

2. The control apparatus according to claim 1, wherein the processor is further configured to determine to give higher priority of the priorities to the data that has much demand for real-time property.

3. The control apparatus according to claim 1, wherein the processor is further configured to determine to give higher priority of the priorities to the data that has much data sized.

4. The control apparatus according to claim 1, wherein the processor is further configured to determine to give higher priority of the priorities to the data that is addressed to one or more of the M terminal whose wireless quality is better.

5. The control apparatus according to claim 1, wherein the processor is further configured to estimate respective timings when transmissions of the received data begin, and transmit the respective estimated timings to the base station.

6. The control apparatus according to claim 1, wherein the processor is further configured to determine the priorities per the base station.

7. A base station in a communication system including the base station and terminals, the base station comprising:

a memory; and a processor coupled the memory and configured to:

receive data addressed to M terminals (where M is a natural number equal to or greater than 2) of terminals;

schedule transmissions of the received data to the M terminals, such that N terminals (where N is a natural number less than M) of the M terminals are scheduled in the same timing by the base station;

schedule transmissions based on determined priorities for the M terminals, and determine the N terminals based on the determined priorities; and wherein the determined priorities are based on at least one of respective data types of the received data, respective data sizes of the received data, and respective wireless qualities between respective M terminals and the base station.

* * * * *